United States Patent [19]

Sandrock et al.

[11] 4,409,180

[45] Oct. 11, 1983

[54] PROCESS FOR MANUFACTURING RARE EARTH INTERMETALLIC HYDRIDABLE COMPOUNDS

[75] Inventors: Gary D. Sandrock, Ringwood, N.J.; Ernest L. Huston, Tuxedo Park, N.Y.; James Liu, Ramsey, N.J.

[73] Assignee: MPD Technology Corporation, Wyckoff, N.J.

[21] Appl. No.: 382,171

[22] Filed: May 26, 1982

[51] Int. Cl.³ .............................................. C22C 19/03
[52] U.S. Cl. ................................... 420/455; 420/416; 420/900; 423/648 R
[58] Field of Search ......................... 423/644, 648 R; 420/416, 441, 455, 900

[56] References Cited

U.S. PATENT DOCUMENTS 3,825,418   7/1974   Reilly et al. ........................... 75/159
4,096,639   6/1978   Sandrock ................................. 34/15

OTHER PUBLICATIONS

HY-STOR Hydridable Alloy List—undated but prior to filing date.
"Hydrogen Absorption by Rare Earth-Transition Metal Alloys", Guidotti et al., Journal of Less Common Metals 52 (1977) 13-28.
"Hydrogen Storage & Purification System", Reilly et al., 1972 BNL 17136 (FIGS. 6, 7, 8 and Table V only).

Primary Examiner—L. Dewayne Rutledge
Assistant Examiner—Christopher W. Brody
Attorney, Agent, or Firm—Francis J. Mulligan, Jr.; Raymond J. Kenny

[57] ABSTRACT

A process for manufacturing intermetallic compounds of the $RB_5$ type where R is a mixture of two or more rare earth metals and B is nickel wherein the composition is determined, with respect to the desired desorption plateau pressure at 25° C. in atmospheres absolute by means of the relationship $$P_{25} = \exp(10.60 - 5.70\, X_{Ce} - 10.03\, X_{La} - 8.46\, X_{Pr} - 7.84\, X_{Nd})$$

wherein X is the weight fraction of the indicated element and $X_{La} + X_{Ce} + X_{Pr} + X_{Nd} = 1$.

2 Claims, No Drawings

PROCESS FOR MANUFACTURING RARE EARTH INTERMETALLIC HYDRIDABLE COMPOUNDS

The present invention is concerned with the manufacture of rare earth intermetallic compounds and, more particularly, with intermetallic compounds having the formula RB$_5$ wherein R is two or more rare earth elements and B is nickel.

BACKGROUND OF THE INVENTION

Intermetallic compounds based on the general formula AB$_5$ form an important class of hydrogen storage materials. In general, A is a rare earth element and B is usually Ni or Co, often with other minor transition metal substitutions. The classic AB$_5$ hydrogen storage compound is LaNi$_5$.

The rare earth elements never appear singly in nature but rather as mixtures. Examples are bastnasite and monazite ores which contain mixtures of primarily Ce, La, Nd, Pr and a multiple of other rare earths and chemically similar elements (e.g., Y and Th). Because of the expense (both in processing and inventory) of isolating La from the natural rare earth mixtures, LaNi$_5$ must always be relatively expensive. The direct use of rare earth mixtures (R) to form RNi$_5$ hydrogen storage compounds is required for cost reductions.

One approach has been to use the naturally occurring mixture of rare earths, mischmetal. For example, bastnasite mischmetal consists of 48–50%Ce, 32–34%La, 13–14%Nd, 4–5%Pr and about 1.5% other rare earths. In fact, hydrogen storage alloys based on bastnasite mischmetalnickel (e.g. the HY-STOR ™ alloys) are commercially available today. Usually a further substitution for R (e.g., Ca) or B (e.g., Al, Fe, Mn, etc.) is made in order to reduce the high plateau pressure and hysteresis of RNi$_5$ hydrides containing natural Ce-rich mischmetals.

At first glance, it might appear that natural mischmetal would be the ultimate R component for RNi$_5$ production. This is not necessarily so. First, the composition of mischmetal varies with time and geographic source, which in turn can lead to variations in RB$_5$ hydride properties. For example, monazite mischmetal has different ratios of the rare earth elements than bastnasite mischmetal. Second, short term demands for individual rare earths can result in their removal in processing with the final by-product having a mixture of rare earths quite different from the original one.

Alloy manufacturers must have the flexibility to use a spectrum of rare-earth mixtures for the production of RNi$_5$ hydrogen storage compounds if they expect to efficiently and economically utilize the lower cost products offered by the rare-earth industry. It is the object of this invention to provide a means whereby this objective can be readily attained.

Other objects and advantages will become apparent from the following description.

The present invention contemplates a process for the manufacture of intermetallic hydridable compounds of the RB$_x$ type having a predictable plateau pressure where R is at least 2 members of the group of rare earth metals consisting of cerium, neodymium, praseodymium and lanthanum and no single element of said group comprises greater than 0.95R (advantageously no greater than 0.9R), where B is nickel and where x is a number from 4.5 to 5.5. The process comprises formulating along with a stoichiometric quantity of nickel, rare earth elements together in weight fractions in accordance with the following equation $$P_{25} = \exp(10.60 - 5.70X_{Ce} - 10.03X_{La} - 8.46X_{Pr} - 7.40X_{Nd})$$

X being the weight fraction of a given element, $X_{Ce} + X_{La} + X_{Pr} + X_{Nd} = 1$, and $P_{25}$ being the desorption plateau pressure at 25° C. in atmospheres absolute to thereby provide an intermetallic compound having a desorption plateau pressure in atmospheres absolute approximately as given by the equation above.

In making the compounds in accordance with the teachings of the present invention at least two approaches can be used. In the first, a mixture of rare earth metals in the metallic form and nickel are melted, solidified and, if desired thermally homogenized. The melted and cast material is then crushed and subjected to a hydrogenation activation. In the second approach, the desired mixture of rare earth metals and nickel is coprecipitated from solution as oxides, hydroxides or carbonates dried and reduced under high temperature conditions using calcium hydride (i.e., metallic calcium and gaseous hydrogen at reduction temperature). After reduction the calcium oxide is leached from the mixture to produce a powdered material which can be hydrided.

In making the present invention a series of intermetallic RNi$_5$ compounds were made as set forth in Table I.

TABLE I

| Comp. Desig. | Weight Fraction | | | | Atom Ratio* | |
| --- | --- | --- | --- | --- | --- | --- |
| | Ce | La | Pr | Nd | Rare Earth | Ni |
| A | 0.007 | 0.616 | 0.092 | 0.285 | 1 | 5.00 |
| B | 0.006 | 0.963 | 0.003 | 0.027 | 1 | 4.90 |
| C | 0.003 | 0.874 | 0.003 | 0.090 | 1 | 4.71 |
| D | 0.002 | 0.830 | 0.035 | 0.132 | 1 | 5.25 |
| E | 0.007 | 0.682 | 0.070 | 0.240 | 1 | 5.34 |
| F | 0.003 | 0.562 | 0.098 | 0.337 | 1 | 4.90 |
| G | 0.006 | 0.426 | 0.145 | 0.423 | 1 | 5.04 |
| H | 0.125 | 0.671 | 0.024 | 0.180 | 1 | 5.38 |
| I | 0.136 | 0.396 | 0.089 | 0.378 | 1 | 5.03 |
| J | 0.141 | 0.657 | 0.078 | 0.123 | 1 | 4.67 |
| K | 0.136 | 0.503 | 0.123 | 0.239 | 1 | 5.23 |
| L | 0.225 | 0.367 | 0.141 | 0.267 | 1 | 4.89 |
| M | 0.256 | 0.360 | 0.043 | 0.341 | 1 | 5.00 |
| N | 0.833 | 0.141 | 0.020 | 0.006 | 1 | 4.90 |
| O | 0.538 | 0.268 | 0.141 | 0.053 | 1 | 5.54 |

*Each compound typically contains as impurities in percent by weight about 0.25% Fe, 0.1% Al, 0.03% O, 0.01% N and 0.005% C.

After melting and casting and, if desired, homogenization at 900° C. for 24 hours to precipitate nickel in excess of 5 atoms, the intermetallic compounds were crushed and then activated by exposure to dry, pure hydrogen gas.

Following activation the hydride characteristics as set forth in Table II were determined.

TABLE II

| Comp. Desig. | 25° C. Plateau Pressure[a] | | $P_A/P_D$ | ln $(P_A/P_D)$ | $\Delta H^c$ | H/M[b] |
| --- | --- | --- | --- | --- | --- | --- |
| | $P_D$ (atm) | $P_A$ (atm) | | | | |
| A | 3.51 | 4.54 | 1.29 | 0.256 | −6712 | 1.05 |
| B | 2.18 | 2.75 | 1.26 | 0.232 | — | 1.06 |
| C | 2.18* | 2.73* | 1.25 | 0.225 | — | 1.05 |
| D | 2.70 | 3.33 | 1.23 | 0.210 | — | 1.04 |
| E | 4.50 | 5.50 | 1.22 | 0.201 | — | 1.05 |
| F | 4.24 | 5.25 | 1.24 | 0.214 | — | 1.03 |
| G | 8.30 | 10.5 | 1.27 | 0.235 | −6320 | 1.00 |
| H | 6.16 | 8.50 | 1.38 | 0.322 | −6672 | 1.03 |
| I | 12.3 | 16.3 | 1.33 | 0.292 | −6003 | 1.02 |
| J | 4.37 | 6.44* | 1.47 | 0.388 | — | 1.03 |
| K | 7.00 | 9.70 | 1.39 | 0.326 | — | 1.05 |
| L | 11.7 | 20.2* | 1.73 | 0.546 | — | 1.04 |

TABLE II-continued

| Comp. Desig. | 25° C. Plateau Pressure[a] $P_D$ (atm) | $P_A$ (atm) | $P_A/P_D$ | ln $(P_A/P_D)$ | $\Delta H$[e] | H/M[b] |
|---|---|---|---|---|---|---|
| M | 11.4 | 19.8 | 1.74 | 0.547 | −5953 | 1.05 |
| N | 4.5[c] | — | — | — | — | 1.06 |
| O | 11.3[d] | 36.2[d] | 3.20 | 1.164 | — | 1.01 |

[a]All compounds were annealed 24 hrs at 900° C. unless noted by * to indicate as-cast condition.
[b]Hydrogen capacity at 69 atm (6.9 MPa).
[c]Measured at −32.5° C.
[d]Measured at 0.0° C., estimated to be 27.5 atm at 25° C.
[e]cal/mole $H_2$ Data as set forth in Table II except from compound N was subjected to a step-wise multiple regression program to determine the relationship between the rare-earth chemistry and the resulting hydriding properties of compounds of the $RNi_5$ type. In this way a general set of equations was obtained that allow prediction of hydriding properties for a wide range of rare-earth compositions without the need for tedious and time-consuming experimental verification of each new compound. Desorption plateau pressure and absorption/desorption pressure hysteresis data were fit to equations of the form:

$$\ln P_D \text{ or } \ln (P_A/P_D) = A_o + \sum_{i=1}^{4} A_i X_i,$$

where the A's are constants to be determined by the regression analysis and the X's are the weight fractions of four rare-earth elements present in the compound with the constraint, $$X_{Ce} + X_{La} + X_{Pr} + X_{Nd} = 1.$$

Plateau pressures in atmospheres absolute at 25° C. for the $RNi_5$ compounds can be calculated from the relation:

$$P_{25} = \exp(10.60 - 5.70 X_{Ce} - 10.03 X_{La} - 8.46 X_{Pr} - 7.40 X_{Nd}.)$$

This equation has a standard error of estimate of 0.152 for in $P_D$ over the pressure range 2–27 atm (0.2–2.7 MPa) for the 15 compounds reported in Table I. At the extremes of its range, this equation predicts plateau pressures of 134, 1.77, 8.51 and 24.6 for binary $RNi_5$ compounds. The corresponding published data are: Ce, 48 atm; La, 1.65 atm; Pr, 8.3 atm; and Nd, 12.9 atm. Thus the equation can also be used near the La and Pr binaries. However, its estimates will be less accurate for Ce or Nd-rich compounds.

Hysteresis at 25° C. for the $RNi_5$ compounds can be calculated from the relation:

$$\ln (P_A/P_D) = 1.240 + 0.470 X_{Ce} - 1.026 X_{La} - 0.287 X_{Pr} - 1.361 X_{Nd}.$$

This equation has a standard error of estimate of 0.047 for ln $(P_A/P_D)$ over the observed range for $P_A/P_D$ of 1.21 to 3.20.

In practicing the present invention one merely applies by trial and error the equations governing plateau pressure and hysteresis to the relative quantities of rare earth metal in stock or obtainable either as pure metals, or preferably as mixtures. One uses the equations singly by arbitrarily fixing three of the rare earth metals along with the required plateau pressure or hysteresis and then solves for the fourth metal. When used together, that is to obtain both a required plateau pressure and hysteresis one need only to fix the weight fraction of two rare earth metals and solve simultaneously for the remaining two. Generally speaking although as a theoretical matter there can be a large number of compositions which will produce a given plateau pressure of hysteresis, a lesser number of compositions will give a combined pressure-hysteresis combination and still fewer number of compositions will be practical considering cost and inventory constraints.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In the manufacture of intermetallic hydridable compounds of the $RB_x$ type having a predictable plateau pressure where R is at least 2 members of the group of rare earth metals consisting of cerium, neodynmium, praseodymium and lanthanum and no single element of said group comprises greater than 0.95R, where B is nickel and where x is a number from 4.5 to 5.5, the improvement comprising formulating and alloying along with a stoichiometric quantity of nickel, rare earth elements together in weight fractions in accordance with the following equation $$P_{25} = \exp(10.60 - 5.70 X_{Ce} - 10.03 X_{La} - 8.46 X_{Pr} - 7.40 X_{Nd})$$

X being the weight fraction of a given element and $$X_{Ce} + X_{La} + X_{Pr} + X_{Nd} = 1$$

to provide an intermetallic compound having a desorption plateau pressure in atmospheres at 25° C. aproximately as given by the equation.

2. A process as in claim 1 wherein the compounds will have a predictable hydriding-dehydriding hysteresis which comprises also formulating along with a stoichiometric quantity of nickel, rare earth elements together in weight fractions in accordance with the following equation $$\ln (P_A/P_D) = 1.240 + 0.470 X_{Ce} - 1.026 X_{La} - 0.287 X_{Pr} - 1.361 X_{Nd}.$$

* * * * *